(12) United States Patent
Todorovic

(10) Patent No.: US 10,066,582 B2
(45) Date of Patent: Sep. 4, 2018

(54) ENGINE COWLING OF A GAS TURBINE WITH THRUST-REVERSING DEVICE AND ADJUSTABLE OUTLET NOZZLE

(71) Applicant: Rolls-Royce Deutschland Ltd & Co KG, Blankenfelde-Mahlow (DE)

(72) Inventor: Predrag Todorovic, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 421 days.

(21) Appl. No.: 14/938,323

(22) Filed: Nov. 11, 2015

(65) Prior Publication Data

US 2016/0131079 A1    May 12, 2016

(30) Foreign Application Priority Data

Nov. 12, 2014   (DE) .................. 10 2014 223 109

(51) Int. Cl.
  *F02K 1/76*   (2006.01)
  *F02K 1/72*   (2006.01)
  (Continued)

(52) U.S. Cl.
  CPC ............ *F02K 1/763* (2013.01); *F01D 17/105* (2013.01); *F02K 1/15* (2013.01); *F02K 1/72* (2013.01);
  (Continued)

(58) Field of Classification Search
  CPC ..... F02K 1/15; F02K 1/72; F02K 1/76; F02K 1/763; F02K 1/766
  See application file for complete search history.

(56) References Cited

U.S. PATENT DOCUMENTS

| | | | |
|---|---|---|---|
| 8,826,799 B2 | 9/2014 | Anscieau et al. | |
| 8,943,794 B2 * | 2/2015 | Moradell-Casellas | F02K 1/72 239/265.31 |

(Continued)

FOREIGN PATENT DOCUMENTS

| | | |
|---|---|---|
| EP | 1878904 A2 | 1/2008 |
| EP | 2466101 A2 | 6/2012 |

(Continued)

OTHER PUBLICATIONS

European Search Report dated Mar. 17, 2016 for related European application No. 15194086.3.

(Continued)

*Primary Examiner* — Arun Goyal
(74) *Attorney, Agent, or Firm* — Shuttleworth & Ingersoll, PLC; Timothy J. Klima

(57) ABSTRACT

An engine cowling of an aircraft gas turbine having a front cowling and a single rear cowling movable in the axial direction. By a drive device, the rear cowling is movable into different positions including a closed cruise position, a partially opened maximum thrust position and a completely opened thrust-reversing position. The drive device includes at least two actuators arranged in series relative to one another and actuated independently of one another, the actuators having power supply systems separated from one another and separately operating, where one of the actuators is designed for the maximum thrust position and the other actuator for the thrust-reversing position. The rear cowling can be locked in the maximum thrust position or the thrust-reversing position by two independent locking devices.

15 Claims, 7 Drawing Sheets

Figure 1:
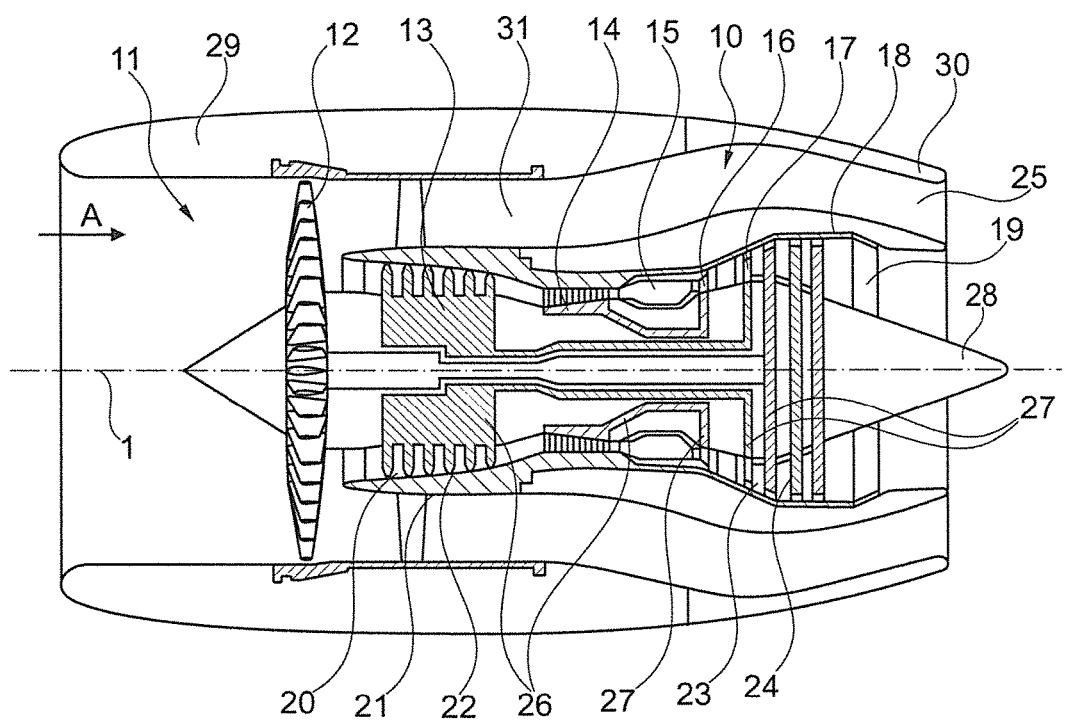

(51) Int. Cl.
 *F01D 17/10* (2006.01)
 *F02K 1/15* (2006.01)

(52) U.S. Cl.
 CPC ............... *F02K 1/76* (2013.01); *F02K 1/766* (2013.01); *F05D 2220/323* (2013.01); *F05D 2240/128* (2013.01); *Y02T 50/671* (2013.01)

(56) References Cited

U.S. PATENT DOCUMENTS

| | | |
|---|---|---|
| 9,562,595 B2* | 2/2017 | Caruel .................... F02K 1/625 |
| 2008/0010969 A1 | 1/2008 | Hauer et al. |
| 2009/0188233 A1 | 7/2009 | Vauchel et al. |
| 2010/0192715 A1 | 8/2010 | Vauchel et al. |
| 2010/0218479 A1 | 9/2010 | Moradell-Casellas et al. |
| 2010/0229528 A1 | 9/2010 | Ramlaoui et al. |
| 2013/0025259 A1 | 1/2013 | Beardsley et al. |
| 2013/0205753 A1 | 8/2013 | Todorovic |
| 2014/0245743 A1 | 9/2014 | Caruel et al. |
| 2015/0097056 A1 | 4/2015 | Caruel et al. |

FOREIGN PATENT DOCUMENTS

| | | |
|---|---|---|
| EP | 2628936 A2 | 8/2013 |
| WO | WO2007099333 A1 | 9/2007 |

OTHER PUBLICATIONS

German Search Report dated Aug. 26, 2015 from counterpart German App No. 10 2014 223 109.4.

* cited by examiner

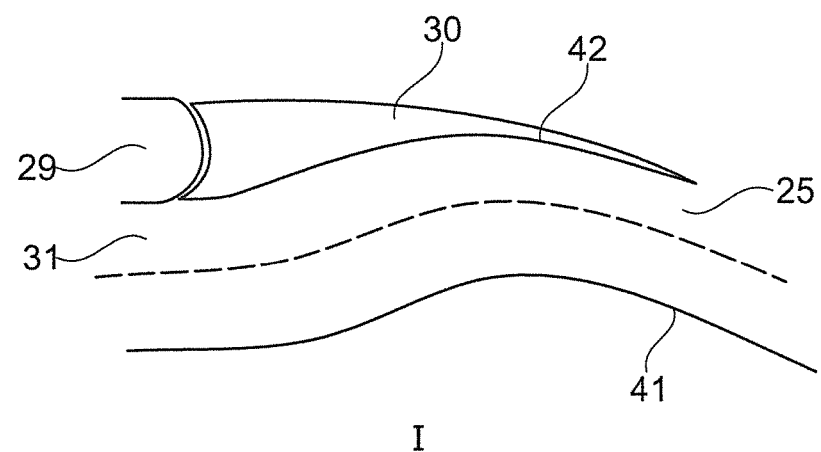
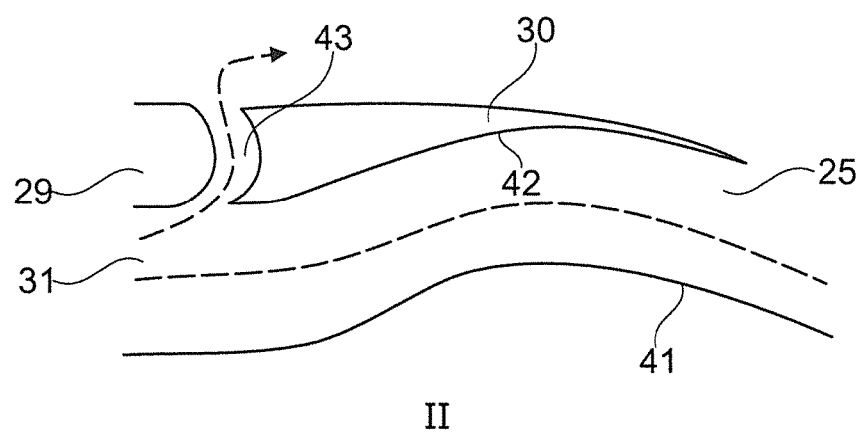
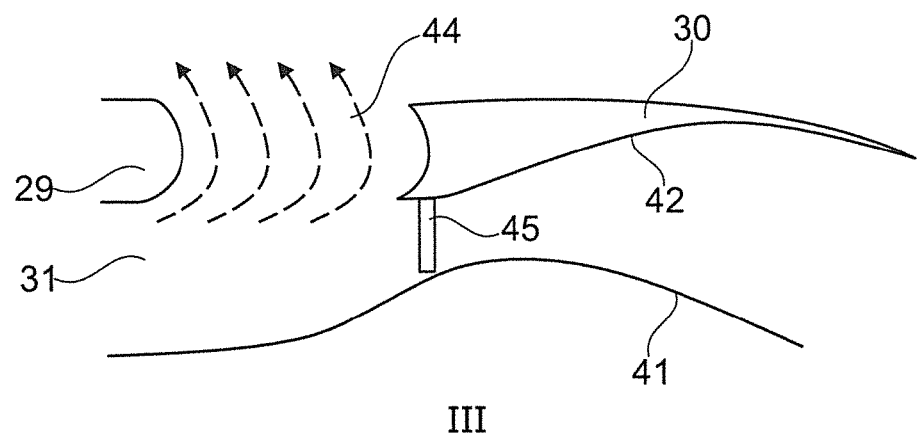
Fig. 2

ENGINE COWLING OF A GAS TURBINE WITH THRUST-REVERSING DEVICE AND ADJUSTABLE OUTLET NOZZLE

This application claims priority to German Patent Application 102014223109.4 filed Nov. 12, 2014, the entirety of which is incorporated by reference herein.

This invention relates to an engine cowling of an aircraft gas turbine in accordance with the features disclosed herein.

In detail, the invention relates to an engine cowling of an aircraft gas turbine having a front cowling and a rear cowling movable in the axial direction relative to the front cowling. The rear cowling is movable into different positions by means of a drive device. Designs of this type are previously known for example from US 2013/025259 A or US 2009/188233A.

In designs known from the state of the art, the rear part (translating cowl of the TRU) of the engine cowling (nacelle) for the thrust-reversing position is actuated by means of an own drive device. A separate drive mechanism is also provided for adjusting the outlet nozzle and can be controlled and actuated independently of the thrust-reversing mechanism. The known designs result in the necessity to duplicate the moving mechanism, which usually includes rollers or sliding rails. It is furthermore necessary to additionally stiffen some of the components or to use additional components. The result is therefore a high overall weight in addition to the complexity of the overall embodiment. The independent drive mechanisms themselves, and their control, monitoring and power supply too, result in a complicated overall structure which is maintenance-intensive and fault-prone.

The object underlying the present invention is to provide an engine cowling of the type mentioned at the beginning, which while being simply designed and easily and cost-effectively producible avoids the disadvantages of the state of the art and leads, in particular, to lower weight and improved functionality and operational safety.

It is a particular object to provide a solution to the above problems by a combination of features disclosed herein. Further advantageous embodiments will become apparent from the present disclosure.

It is thus provided in accordance with the invention that a single rear cowling is movable into different positions by means of the drive device designed with a dual action. In accordance with the invention, the rear cowling can be moved into a closed cruise position in which the cowling, when viewed in the direction of flight, is moved forwards and provides optimum performance with a minimum of fuel consumption. A further position is a partially opened position for maximum thrust (max. take off). In this position, the inner region of the rear cowling is used to adapt the cross-section or through-flow surface of the outlet nozzle of the bypass duct. A third position represents a completely opened thrust-reversing position, in which the rear cowling is moved the maximum distance to the rear so that thrust-reversing elements, cascade elements or similar can be used. There is thus, in accordance with the invention, a considerable increase in operational safety, since an inadvertent actuation of the thrust reverser is completely ruled out and partial opening for maximum thrust too can be performed safely.

The solution concept in accordance with the invention can thus use an existing design for thrust reversing to achieve therewith an additional functionality, i.e. changing the cross-section of the outlet nozzle of the bypass duct. To do so, the rear cowling is only partially opened, which creates the possibility to change the geometry of the outlet nozzle (annulus) such that a larger outflow cross-section is obtained, for example by 20%. At the same time, an additional outlet region is created between the front (fixed) and the rear (translatable) cowling which has a particularly advantageous effect in particular for engine conditions with maximum thrust (take-off configuration) or helps to increase the flow separation limit or the flutter limits of the fan.

In a particularly favourable embodiment of the invention, it is provided that the rear cowling is designed on its inside facing the engine axis with a configuration for changing the cross-section of the outlet nozzle of the bypass duct. With known designs, this is not possible or only possible to a limited extent, since shut-off doors or similar are provided in the region of the outlet nozzle for thrust reversing. The rear cowling therefore has, in accordance with the invention, an additional functionality.

It is furthermore particularly favourable for the drive device to include at least two actuators arranged in series relative to one another and actuated independently of one another. This makes it possible in accordance with the invention to provide a drive device equipped with two functionalities, whose two actuators are each effective for one of the operating positions of the rear cowling. The actuators can be designed in accordance with the invention with hydraulic and/or electric action. Due to the independence of the two actuators provided in accordance with the invention, in particular with regard to power supply and control, the design in accordance with the invention is functionally dependable to a high degree. In accordance with the invention, one of the actuators is operated for each of the different positions of the rear cowling. This prevents the rear cowling from being moved into unwanted operating positions. It is therefore particularly favourable that one of the actuators is designed for the maximum thrust position (adjustment of the outlet nozzle by a partial displacement of the rear cowling) and the other actuator for the thrust-reversing position (by a complete displacement of the rear cowling).

To increase operational safety, it is furthermore provided in accordance with the invention that the rear cowling can be locked in the maximum thrust position or the thrust-reversing position by means of two independent locking devices. As a result, no problems can occur with the control or the operation of the actuators, since that rear cowling position which is not required is blocked. The locking devices can for example include pins than can be inserted into or removed from an oblong hole provided on the rear cowling.

The solution in accordance with the invention thus provides that the engine cowling is divided into two assemblies, i.e. the front cowling and a single rear cowling. The rear cowling is moved in accordance with the invention into different positions, enabling optimization of the cross-section of the outflow nozzle as well as a thrust-reversing function. As a result only a single component is moved, i.e. the rear cowling, while the front cowling remains fixed. This fundamentally distinguishes the solution in accordance with the invention from the state of the art, in which different components can be actuated independently of one another using different actuators. In contrast to this, it is provided in accordance with the invention that the single rear cowling can be moved into different positions by means of two independent actuators. For each of these positions a separate actuator is thus available, which is actuated independently of the other actuator and is also independent of the other actuator with regard to its control and power supply. Operational safety is improved in that the two actuators can be locked independently of one another by means of the locking device. This means that there are for a single assembly, i.e. the rear cowling, two actuation devices completely separate from one another. This leads to a considerable increase in operational safety, as was set forth in the above (very strange sentence construction after the comma). Additionally to the separate control of the two actuators and the separate power supply, operational safety also results from the two actuators preferably each being used only between two operating states, i.e. a completely retracted state and a completely extended state. Intermediate positions, as provided in the state of the art, no longer exist. This also obviates the need to detect and monitor these intermediate positions. The respective end positions of the actuators (completely retracted or completely extended) are fixed by the locking devices, so that there is no possibility of the actuators moving unintentionally during operation and hence moving the rear cowling in the axial direction.

It is obvious that within the scope of the invention several pairs of actuators and locking devices can be arranged spread around the circumference of the engine cowling. Furthermore, the front and the rear cowling can each be designed substantially circular.

The design in accordance with the invention thus results in the advantage that the number of components can be considerably reduced. This results in a large weight reduction and an increase in operational safety. Operating the rear cowling is considerably simplified and hence safer and easier.

Figure 3:
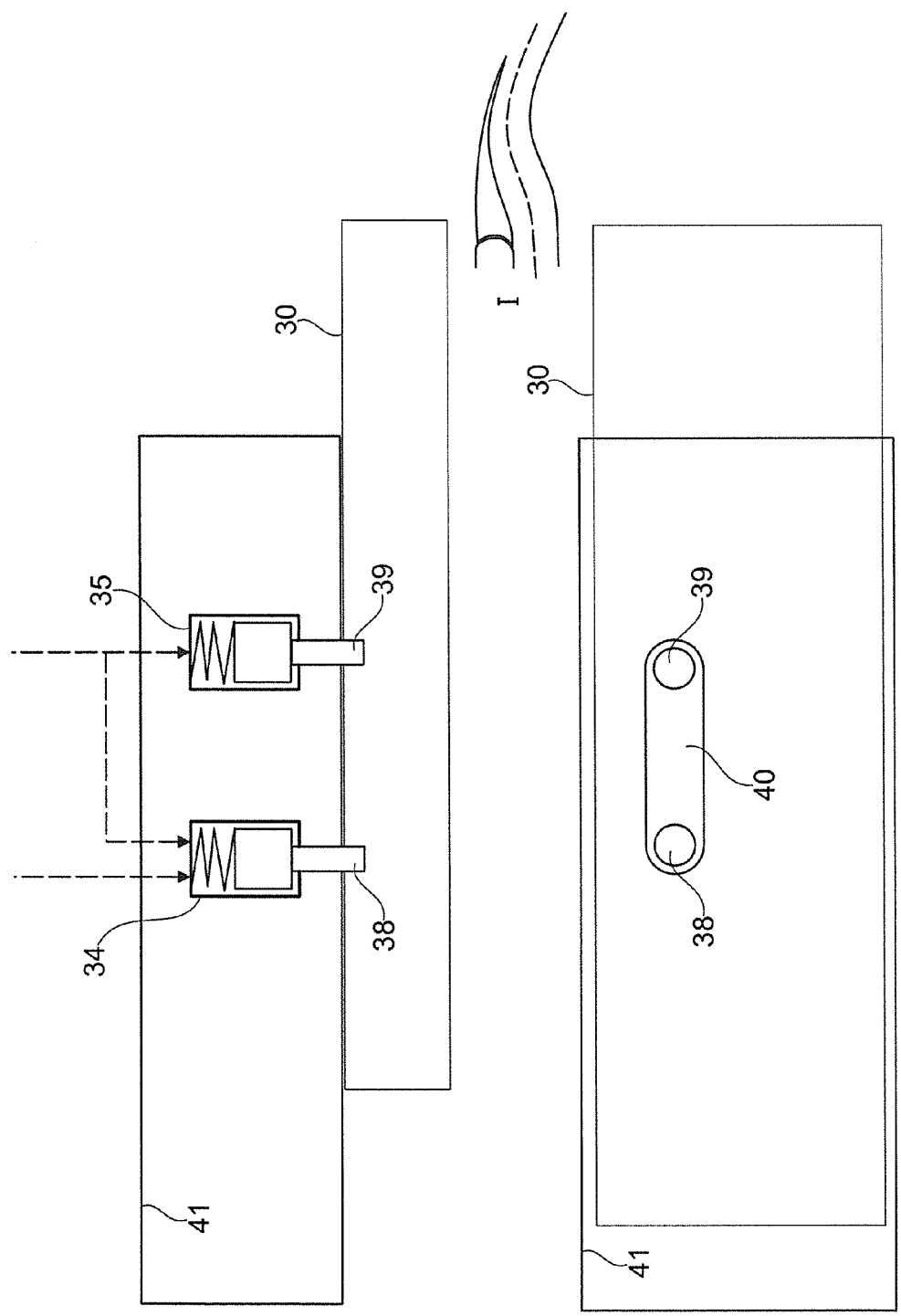
Figure 4:
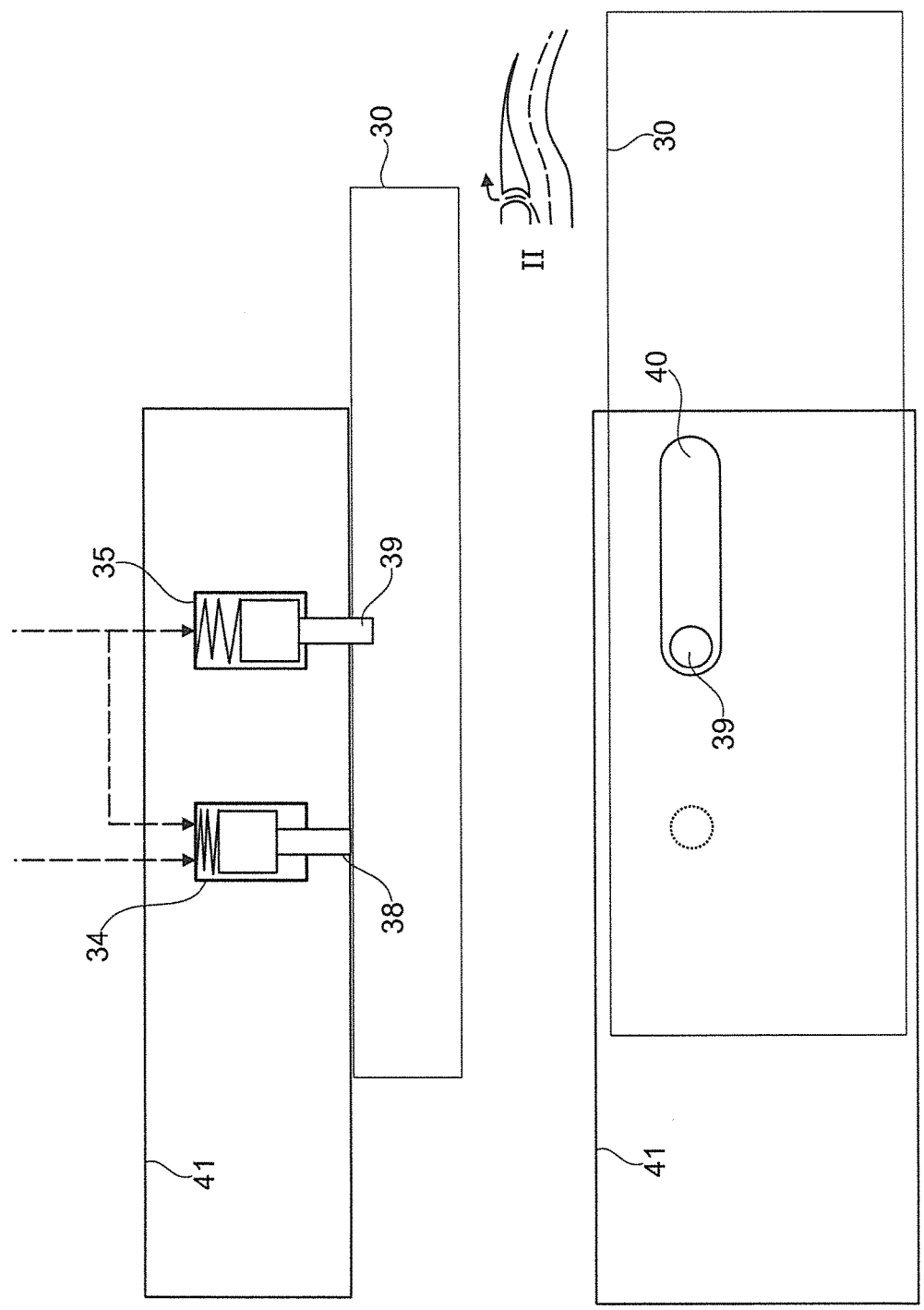
Figure 5:
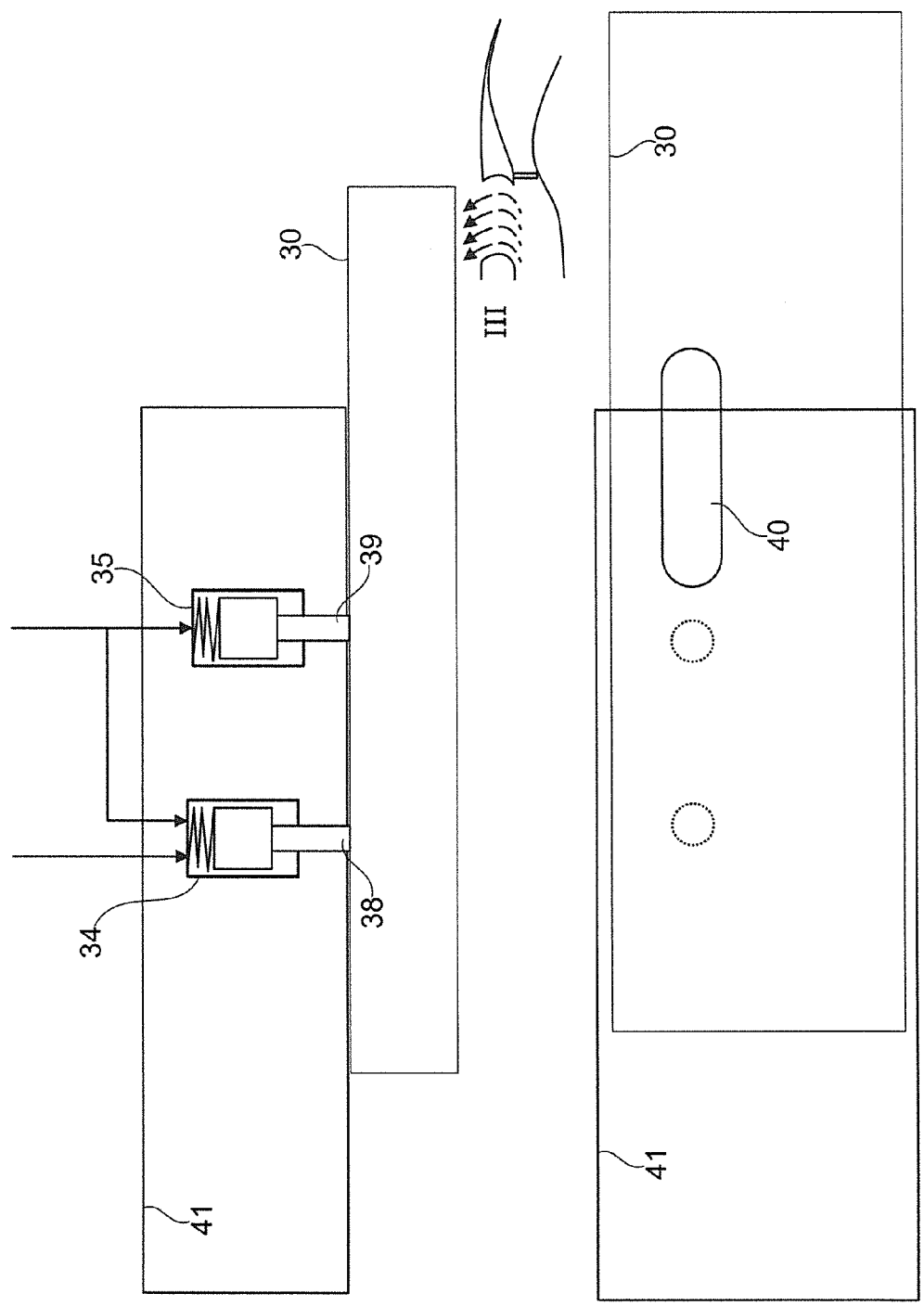
Figure 6:
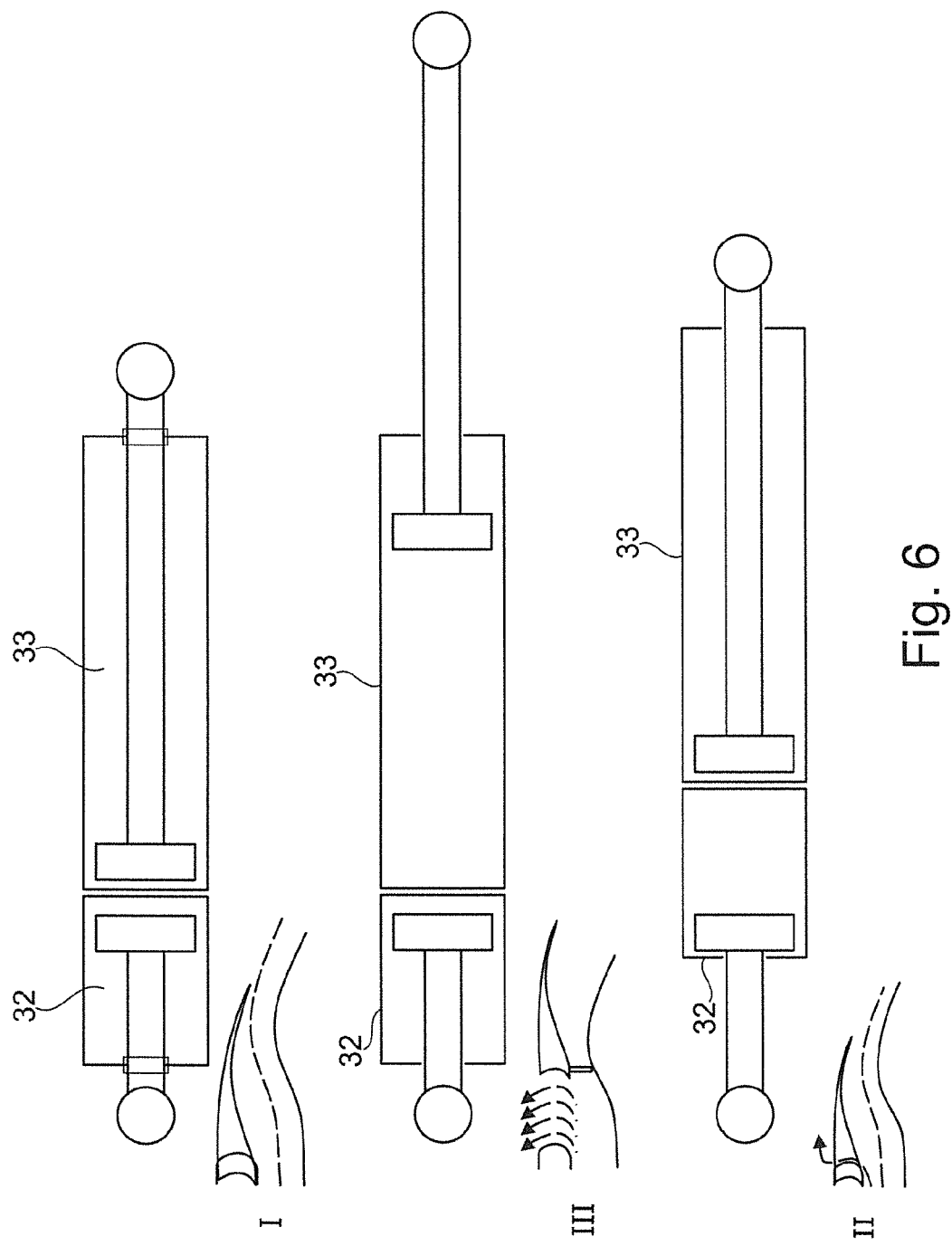
Figure 7:
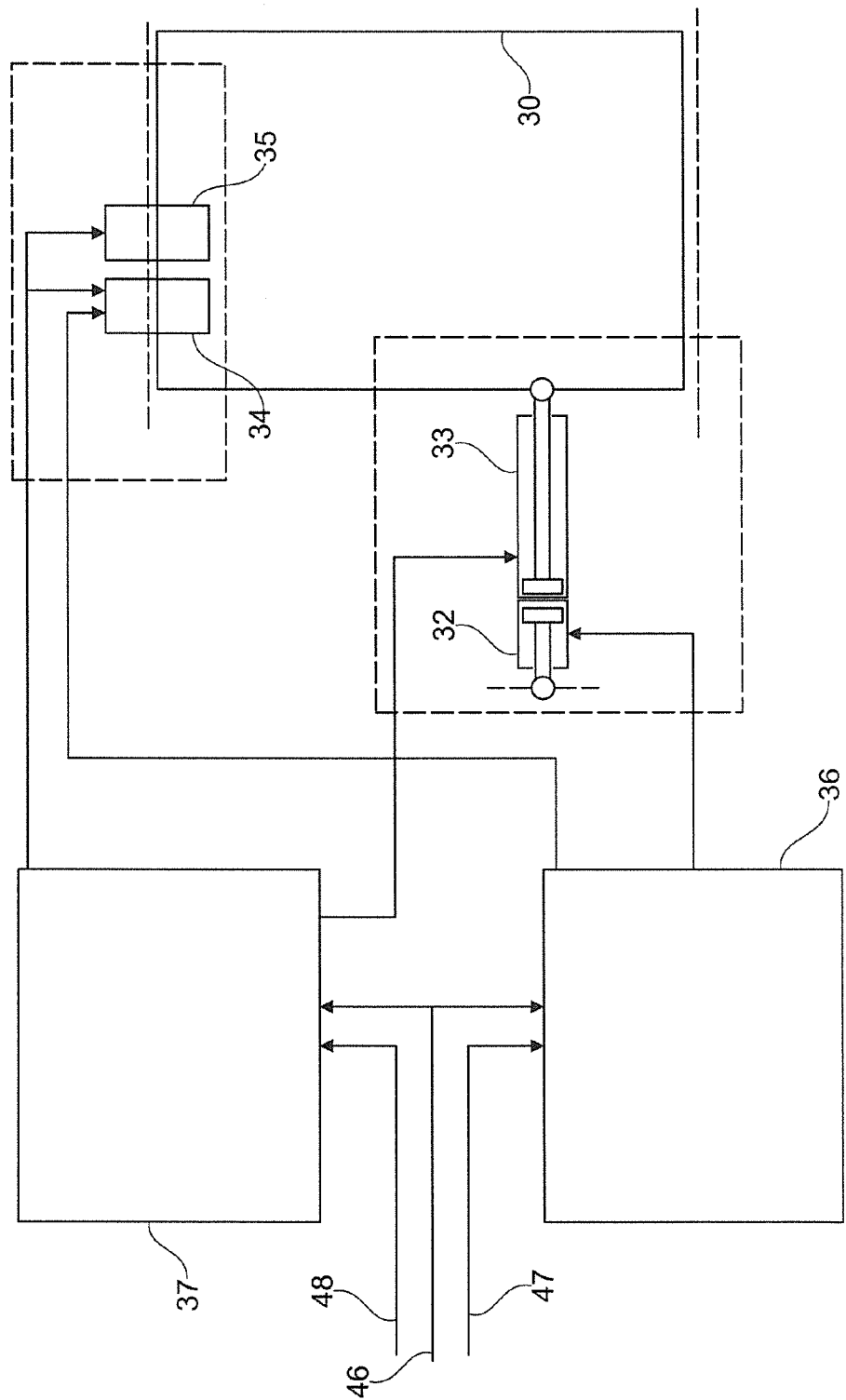

The present invention is described in the following on the basis of an exemplary embodiment. Here, FIG. 1 shows a schematic representation of a gas-turbine engine in accordance with the present invention, FIG. 2 shows a schematic representation of the three different operating states, FIGS. 3 to 5 show simplified representations of the locking devices in the three different operating states, FIG. 6 shows a schematic representation of the mode of operation of the drive device in the three different operating states, and FIG. 7 shows a schematic representation of the allocation of drive device, locking device and power supply.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the core engine casing 21 into an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine rotor blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows in three different and simplified representations the structure and the mode of operation of the engine cowling in accordance with the invention, in three different operating positions.

FIG. 2 shows operating state I with a position of a rear cowling 30 in which the latter, when seen in the flight direction, is moved forwards and is in sealing contact with a front cowling 29. This position corresponds to the cruise position of the aircraft gas turbine. The air flowing through a bypass duct 31 can flow out through an outlet nozzle 25. It can be seen here that the aircraft gas turbine has an inner structure 41 for configuring the outlet nozzle 25. The inner structure 41 is provided by part of the cowling of the core engine casing 21. An inner structure 42 of the rear cowling 30 is formed accordingly. These embodiments correspond to the state of the art.

Part II of FIG. 2 shows an operating state in which the rear cowling 30 is moved somewhat towards the rear. This opens up an outflow gap 43 through which part of the flow from the bypass duct 31 can flow off radially outwards. The movement of the rear cowling 30 at the same time has the effect that the outlet nozzle 25 is configured in such a way that a maximum thrust of the aircraft gas turbine is obtained and stable operation of the fan with regard to stalling and/or flutter is assured.

Representation III of FIG. 2 shows an operating state in which the rear cowling 30 is moved towards the rear by the maximum travel distance. The flow therefore exits the bypass duct 31 as a thrust-reversing flow 44, and the outlet nozzle 25 is blocked by blocking elements 45, for example blocking doors or similar. A thrust-reversing position is therefore obtained.

FIGS. 3 to 5 show in schematic representation in side view and top view different operating positions of the locking devices provided in accordance with the present invention.

FIG. 3 shows the state I (see FIG. 2), representing the cruise configuration of the aircraft gas turbine. In accordance with the invention, two locking devices 34, 35 are provided that include pins 38 and 39 respectively, which can be inserted into an oblong hole 40 provided on the rear cowling 30. FIG. 3 shows in the upper illustration a simplified side view, whereas the lower illustration shows a simplified top view. These representations are retained in analogous form in FIGS. 4 and 5 too.

FIG. 3 shows an operating state in which both locking devices 34 and 35 are active. The pins 38, 39 are moved forward electrically or hydraulically and engage in the oblong hole 40. As a result, the rear cowling 30 is locked in the cruise configuration by means of the two locking devices 34 and 35.

FIG. 4 shows an operating state analogous to II in FIG. 2, where the rear cowling 30 is moved a short distance rearwards. The locking device 35 relevant for the thrust-reversing function is in the locked state, while the locking device 34 is released. It is thus possible that the rear cowling 30 is moved rearwards, but without opening the thrust-reversing function. This results in a maximum of operational safety; the safety requirements are met in full. The travel distance is limited by the length of the oblong hole 40 and by the pin 39 inserted into it.

FIG. 5 shows a third operating state III in accordance with FIG. 2, in which both locking devices 34 and 35 are released, so that the rear cowling 30 can be moved to the maximum to assume the thrust-reversing position.

FIG. 6 shows in a schematic representation actuators 32 and 33 which can be actuated electrically or hydraulically. For simplification of the representation, FIG. 6 shows piston-cylinder units. The upper part of FIG. 6 shows the operating state I in accordance with FIG. 2, in which the rear cowling 30 is moved completely to the front. The lower illustration of FIG. 6 shows the operating state II, in which the left-hand actuator 32 is actuated, so that the rear cowling 30 can be moved by a partial distance for the maximum thrust position. The middle illustration of FIG. 6 shows the thrust-reversing operating state III, in which the actuator 33 is actuated. The result is thus that for each of the operating states II and III a separate actuator is used, so that the drive device for moving the rear cowling can be actuated in each case in an operationally safe manner. Although the two actuators are installed adjacent to one another, they are actuated completely independently of one another due to completely separate control circuits and power supply circuits (hydraulically or electrically). All further known functions of the thrust reverser, such as synchronization of the components and actuation of blocking elements (45), can still be used, regardless of the operating state II.

FIG. 7 shows schematically the structure of the control and power supply for the engine cowling in accordance with the invention, where a power supply and a control for the operating state II of maximum thrust are formed by one control unit 36, while a control unit 37 effects power supply and control for the thrust-reversing position III. The power supply is shown by the lines 46. The control unit 36 is operated by a signal 47, while the control unit 37 is operated by a signal 48. FIG. 7 shows that the two actuators 32 and 33 are assigned exclusively to the control unit 36 and the control unit 37 respectively and are actuated by them. The drive device in accordance with the invention thus includes two actuators 32 and 33 arranged in series and independent of one another both with regard to their power supply and to their control and monitoring. In the same way, the two locking devices 34 and 35 are assigned to one each of the control units 36 and 37, with the control unit 37 also being in operational connection with the locking device 34 to secure the position of the rear cowling 30 in the cruise configuration I (see FIG. 3). A displacement of the rear cowling 30 into the maximum thrust position can therefore on no account lead to actuation of the thrust reverser.

LIST OF REFERENCE NUMERALS

1 Engine axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing
22 Compressor rotor blades
23 Stator vanes
24 Turbine rotor blades
25 Outlet nozzle
26 Compressor drum or disk
27 Turbine rotor hub
28 Exhaust cone
29 Front cowling
30 Rear cowling
31 Bypass duct
32 Actuator
33 Actuator
34 Locking device
35 Locking device
36 Control unit
37 Control unit
38 Pin
39 Pin
40 Oblong hole
41 Inner structure
42 Inner structure
43 Outflow gap
44 Thrust-reversing flow
45 Blocking element
46 Power
47 Signal
48 Signal

What is claimed is:

1. An engine cowling of an aircraft gas turbine, comprising:
a front cowling,
a single rear cowling movable in the axial direction,
a drive device operatively connected between the rear cowling and a fixed portion of the aircraft gas turbine for moving the rear cowling into different positions with respect to the front cowling,
wherein the drive device includes two actuators arranged in series relative to one another to provide a dual action for moving the rear cowling with respect to the front cowling between a closed cruise position, a partially opened maximum thrust position and a completely opened thrust-reversing position,
wherein each of the two actuators includes separate power supply and control circuits to be actuatable independently of the other of the two actuators,
wherein an operating portion of a first one of the two actuators occupies a first axial area of the drive device and an operating portion of a second one of the two actuators occupies a second axial area of the drive device separated from the first axial area, such that there is no overlap between the first axial area and the second axial area,
wherein a first one of the two actuators has a first actuating range which moves the rear cowling to the maximum thrust position and a second one of the two actuators has a second actuating range that moves the rear cowling to the thrust-reversing position, two independent locking devices for locking the rear cowling in at least one chosen from the closed cruise position and the partially opened maximum thrust position, and
wherein the rear cowling includes an oblong hole and the two independent locking devices each include a pin that can be removably inserted into the oblong hole.

2. The engine cowling in accordance with claim 1, wherein the rear cowling includes, on an inside portion facing an engine axis, a structure for changing a cross-section of an outlet nozzle of a bypass duct of the aircraft gas turbine.

3. The engine cowling in accordance with claim 2, wherein the two actuators are at least one chosen from hydraulic actuators and electric actuators.

4. The engine cowling in accordance with claim 3, and further comprising first control unit and second control unit, the first control unit operatively connected to and controlling the first one of the two actuators and a first one of the two independent locking devices and the second control unit operatively connected to and controlling the second one of the two actuators and a second one of the two independent locking devices, the first control unit and the second control unit being independent of one another.

5. The engine cowling in accordance with claim 4, and further comprising a plurality of the two actuators and a plurality of the two independent locking devices spread around circumference of the engine cowling.

6. The engine cowling in accordance with claim 1, wherein the two actuators are at least one chosen from hydraulic actuators and electric actuators.

7. The engine cowling in accordance with claim 6, and further comprising first control unit and second control until, the first control unit operatively connected to and controlling the first one of the two actuators and a first one of the two independent locking devices and the second control unit operatively connected to and controlling the second one of the two actuators and a second one of the two independent locking devices, the first control unit and the second control unit being independent of one another.

8. The engine cowling in accordance with claim 7, and further comprising a plurality of the two actuators and a plurality of the two independent locking devices spread around a circumference of the engine cowling.

9. The engine cowling in accordance with claim 1, and further comprising first control unit and second control unit, the first control unit operatively connected to and controlling the first one of the two actuators and a first one of the two independent locking devices and the second control unit operatively connected to and controlling the second one of the two actuators and a second one of the two independent locking devices, the first control unit and the second control unit being independent of one another.

10. The engine cowling in accordance with claim 9, and further comprising a plurality of the two actuators and a plurality of the two independent locking devices spread around a circumference of the engine cowling.

11. The engine cowling in accordance with claim 1, and further comprising a plurality of the two actuators and a plurality of the two independent locking devices spread around a circumference of the engine cowling.

12. An engine cowling of an aircraft gas turbine, comprising:
a front cowling,
a single rear cowling movable in the axial direction,
a drive device operatively connected between the rear cowling and a fixed portion of the aircraft gas turbine for moving the rear cowling into different positions with respect to the front cowling,
wherein the drive device includes two actuators arranged in series relative to one another to provide a dual action for moving the rear cowling with respect to the front cowling between a closed cruise position, a partially opened maximum thrust position and a completely opened thrust-reversing position,
wherein each of the two actuators includes a separate power supply system to be actuatable independently of the other of the two actuators,
wherein a first one of the two actuators has a first actuating range which moves the rear cowling to the maximum thrust position and a second one of the two actuators has a second actuating range that moves the rear cowling to the thrust-reversing position, two independent locking devices for locking the rear cowling in at least one chosen from the closed cruise position and the partially opened maximum thrust position;
wherein the rear cowling includes an oblong hole and the two independent locking devices each include a pin that can be removably inserted into the oblong hole.

13. The engine cowling in accordance with claim 12, wherein the two actuators are at least one chosen from hydraulic actuators and electric actuators.

14. The engine cowling in accordance with claim 12, and further comprising first control unit and second control unit, the first control unit operatively connected to and controlling the first one of the two actuators and a first one of the two independent locking devices and the second control unit operatively connected to and controlling the second one of the two actuators and a second one of the two independent locking devices, the first control unit and the second control unit being independent of one another.

15. The engine cowling in accordance with claim 12, and further comprising a plurality of the two actuators and a plurality of the two independent locking devices spread around a circumference of the engine cowling.

* * * * *